United States Patent [19]

Kaihola et al.

[11] Patent Number: 5,357,114
[45] Date of Patent: Oct. 18, 1994

[54] METHOD FOR USE IN LIQUID SCINTILLATION COUNTING FOR DETECTING, RECORDING AND ANALYZING SCINTILLATION PHENOMENA

[75] Inventors: Lauri Kaihola, Littoinen; Pertti Mäntynen, Forssa; Jarmo Nurmi, Kuusisto, all of Finland

[73] Assignee: Wallac Oy, Turku, Finland

[21] Appl. No.: 969,282

[22] PCT Filed: May 9, 1991

[86] PCT No.: PCT/FI91/00144

§ 371 Date: Jan. 8, 1993

§ 102(e) Date: Jan. 8, 1993

[87] PCT Pub. No.: WO91/17461

PCT Pub. Date: Nov. 14, 1991

[30] Foreign Application Priority Data

May 10, 1990 [FI] Finland ................................. 902332

[51] Int. Cl.$^5$ ............................................. G01T 1/204
[52] U.S. Cl. .................................. 250/364; 250/362; 250/328
[58] Field of Search ....................... 250/328, 362, 364

[56] References Cited

U.S. PATENT DOCUMENTS

| | | | |
|---|---|---|---|
| 4,914,300 | 4/1990 | Kalish | 250/362 X |
| 5,025,161 | 6/1991 | Dodson | 250/364 |
| 5,146,093 | 9/1992 | Valenta et al. | 250/364 X |
| 5,210,419 | 5/1993 | Buheitel | 250/362 |

OTHER PUBLICATIONS

Oikara et al., "Simultaneous Counting of Low Alpha- and Beta-Particle Activities with Liquid-Scintillation Spectrometry and Pulse-Shape Analysis", Appl. Radiat. Isot. vol. 38, No. 10, pp. 875-878, 1978.

Primary Examiner—Constantine Hannaher
Assistant Examiner—Edward J. Glick
Attorney, Agent, or Firm—Adduci, Mastriani, Schaumberg & Schill

[57] ABSTRACT

A method for use in liquid scintillation counting for detecting, recording and analyzing scintillation phenomena due to ionizing radiation in a device having a measuring chamber into which the sample is placed and which sample is measured with at least two light detectors. The occurrences of the measurement are recorded so completely that the measurement can be reconstructed and the analyzing principle can be decided afterwards.

19 Claims, 8 Drawing Sheets

METHOD FOR USE IN LIQUID SCINTILLATION COUNTING FOR DETECTING, RECORDING AND ANALYZING SCINTILLATION PHENOMENA

BACKGROUND OF THE INVENTION

1. Field of the Invention

The invention relates to a method for use in liquid scintillation counting for detecting, recording and analyzing scintillation phenomena due to ionizing radiation in a device comprising a measuring chamber into which the sample is placed and is detected by means of at least two light detectors.

Liquid scintillation counting is a generally known method for detecting radioactive radiation. The sample is placed in a bottle and the scintillation liquid is added thereto transforming the radiation of the sample into light pulses detected by the photomultiplier tube. There are two photomultipliers operating simultaneously and their combined signal is analyzed. The simultaneous technique eliminates the background caused by thermal noise of the photomultipliers by accepting only the signals detected simultaneously by both tubes.

The drawback of the above technique is the fact that, especially in the measurement of low active isotopes, it is difficult to identify and eliminate the background radiation components of liquid scintillation counting. Nowadays the most advanced devices like, e.g., the 1220 Quantulus TM manufactured by Wallac Oy are provided, around the actual measuring chamber, with a guard detector which removes a major part of the occurrences of the sample arising from external sources by means of a non-simultaneous technique.

Furthermore liquid scintillation counters like the 1220 Quantulus TM and 1219 SM comprise a pulse shape analyzer which enables separation of the pulses produced by alpha and beta particles in the sample. An optimum separation requires, however, that right setting values are provided at the start of the measurement. Otherwise, the measurement will not succeed. The required settings are affected by e.g. the optical and/or the chemical state of the sample as well as scintillation liquid used.

Also, the photomultiplier tubes cause interference. For reducing background pulses from photomultiplier tubes (cross-talk), the above liquid scintillation counter is provided with an amplitude comparator accepting as real pulses from a sample only those pulses which come from different tubes and which are of equal size within a selected accuracy. The optimum settings of the amplitude comparator depends on the state of the sample and the scintillation liquid used.

The above mentioned liquid scintillation counters can be used to produce four spectra at the most from the sample by means of a multi-channel analyzer, which can be set in a versatile way to separate phenomena appearing in the sample according to the nature and origin of the radiation. Finding the optimal settings for the pulse shape analyzer and the amplitude comparator requires, however, several test measurements to be performed beforehand.

SUMMARY OF THE INVENTION

The object of the present invention is to eliminate the above drawbacks and to obtain a new method which differs from the prior art and which does not have the above drawbacks.

The invention is characterized in that the occurrences of the measurement are recorded so completely that the measurement can be reconstructed and the analyzing principle can be decided afterwards and desired items can be output from the measurement data.

In the method according to the invention, each amplitude, pulse shape and pulse entry time of each phenomenon which satisfies the collecting criteria is digitized and recorded. At the same time, the state of the guard detector and that of the electromagnetic interference indicator are recorded. By means of these parameters, the analysis which is done either during or after measuring, produces an optimum result even from a signal measurement.

The method enables identification of the origin of particle and photon radiation which provides maximum performance of the device without any fixed preset parameter settings.

Since searching of preset parameter settings is avoided in the method of the invention, a lot of work is saved in the measurement. Furthermore and especially in measuring of low active samples, a significant amount of time is saved because even the mere test measurements are remarkably lengthy due to low pulse frequency.

The light pulse produced by phenomenon taking place in the sample is detected by two photomultipliers. The amplitude of the detected light pulse is proportional to the energy released in the phenomenon but it can also be affected by the state of the sample itself due to factors like optical or chemical damping. Light pulses are also generated as a result of radiation from the environment in which case the ratio of the amplitudes of the pulses detected by the two photomultipliers on the average varies more than in cases of real radioactive decays taking place in the sample.

In addition to normal energy spectra, the device can produce an amplitude distribution and amplitude pulse shape distribution of different photomultiplier tubes. Based on time information, the number of pulses as a function of time, scattering diagram, i.e., the successive time differences as a function of each other, the distribution function of the time difference and the autocorrelation function of the time difference can also be produced.

The state of the guard detector and that of the interference indicator as well as the information on the pulse shapes and amplitudes are used for identification of the nature of the radiation. The radiations to be identified are alpha and beta radiation and cosmic radiation. Time information is a means for identifying the Poisson nature of the process and it effectively reveals possible deviating phenomena, which originate from interferences, even at the beginning of the computing process.

The recorded time information combined with the information on pulse shapes and pulse amplitudes enables, within the limits of the time resolution of the device, simultaneous identification of several particles from the spectra. When the pulses produced by the particles appear on different spectra or on different parts of the same spectrum, the interpretation is easy. It is in this way that, e.g., static electricity, alpha, beta, and X-ray radiation as well as Compton electrons are separated from each other.

BRIEF DESCRIPTION OF THE DRAWINGS

The invention will be described in the following by means of examples referring to the enclosed drawings, in which:

FIGS. 10-13 show schematically the operation of the pulse shape analyzer.

DESCRIPTION OF THE PREFERRED EMBODIMENTS

Figure 1:
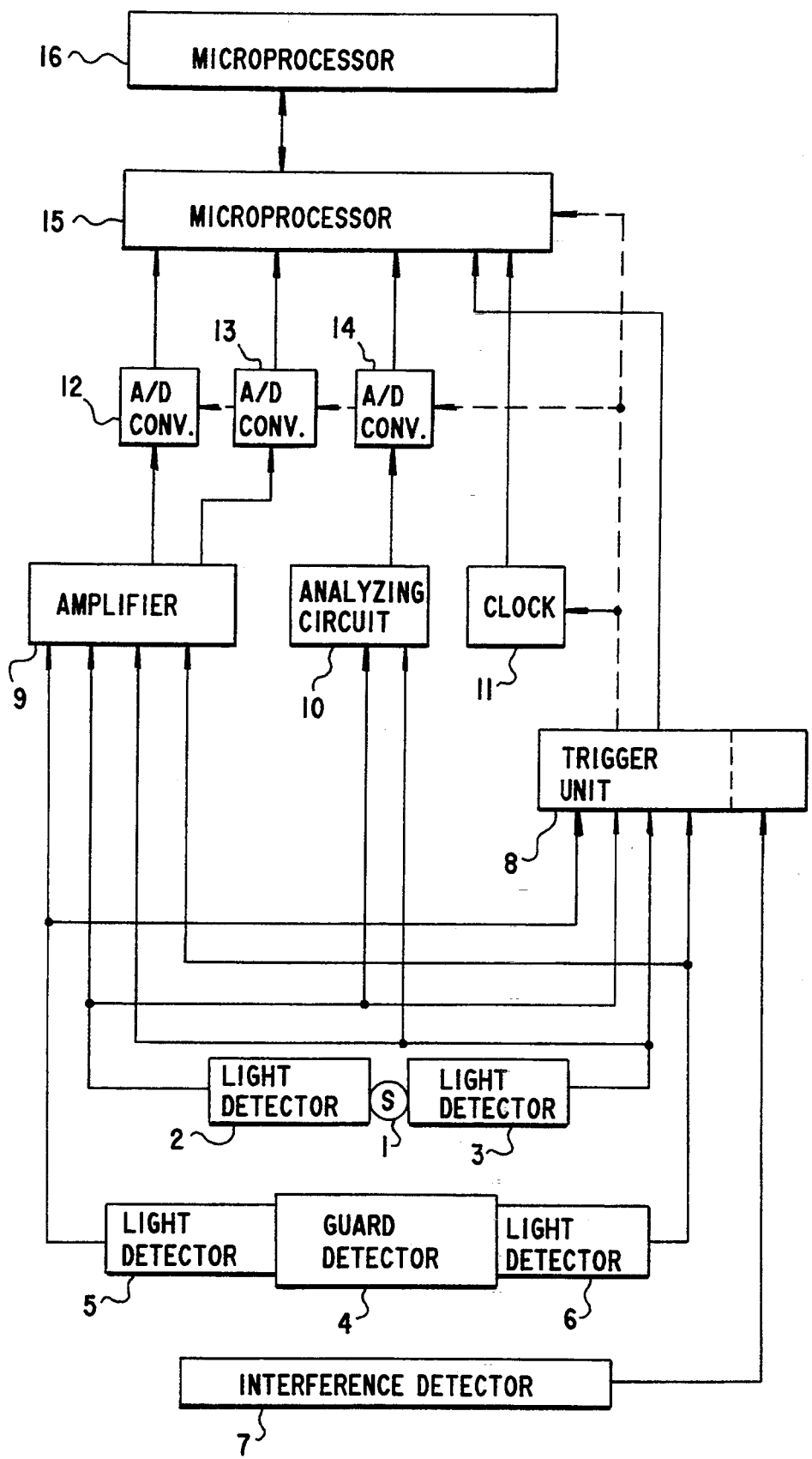
FIG. 1 shows schematically the measuring system according to the invention.

FIG. 1 shows schematically the measuring system according to the invention. Scintillations emanating from the sample 1, which is kept in a light-tight or light-free measuring chamber, are detected by the first light detector 2 and the second light detector 3. Outside the measuring chamber, there is provided a separate, so-called guard detector 4 whose scintillations are detected by means of light detectors 5 and 6.

Signals from light detectors 2, 3, 5 and 6 are led to an amplifier unit 9 and to a triggering unit 8. The signal of the first light detector 2 and that of the second light detector 3 are further connected to the analyzing circuit 10. Two analog-to-digital converters 12 and 13 are connected to the amplifier unit 9. It is also possible to have only one converter but two converters will speed up the measurement.

The amplifier unit is programmable so that a desired combination of the following signals can be connected to the analog-to-digital converters 12 and 13: the signals from the first light detector 2 or the second light detector 3 either separately or their combined signal, the signal from one or both of the light detectors of guard detectors 5 or 6 or their sum signal.

The analyzer 10 transforms the time dependence of the pulse amplitude, which is proportional to the number of photons of the scintillation, into a voltage and is further connected to the analog-to-digital converter 14.

The timing pulse from the triggering unit 8 controls the operation of the analog-to-digital converters 12-14 and tells the microprocessor the occurrence of the phenomenon. The timing pulse can be generated by the first light detector 2 or the second light detector 3 or their coincidence, i.e., simultaneous operation, or delayed coincidence, one or both of the light detectors of the guard detectors or their coincidence as well as any combination of the above alternatives.

The timing pulse also stores the states of the above mentioned signals and that of the electromagnetic interference detector 7 for the microprocessor 15. Furthermore, the timing pulse controls the operation of the pulse interval clock 11.

The analog-to-digital converters 12-14, pulse interval clock 11, and the triggering unit 8 are connected to the microprocessor 15, which records desired information about the occurrence and sends it to the microcomputer 16. Parameters of this kind are the amplitude of the first light detector 2 and that of the second light detector 3, the time dependence of the amplitude, the entry time of the pulse and the state of the guard detector and that of the electromagnetic interference detector 7. The microcomputer 16 records the occurrences to a mass memory unit during measuring. The original order of phenomena remains unchanged in the recording.

Figure 2:
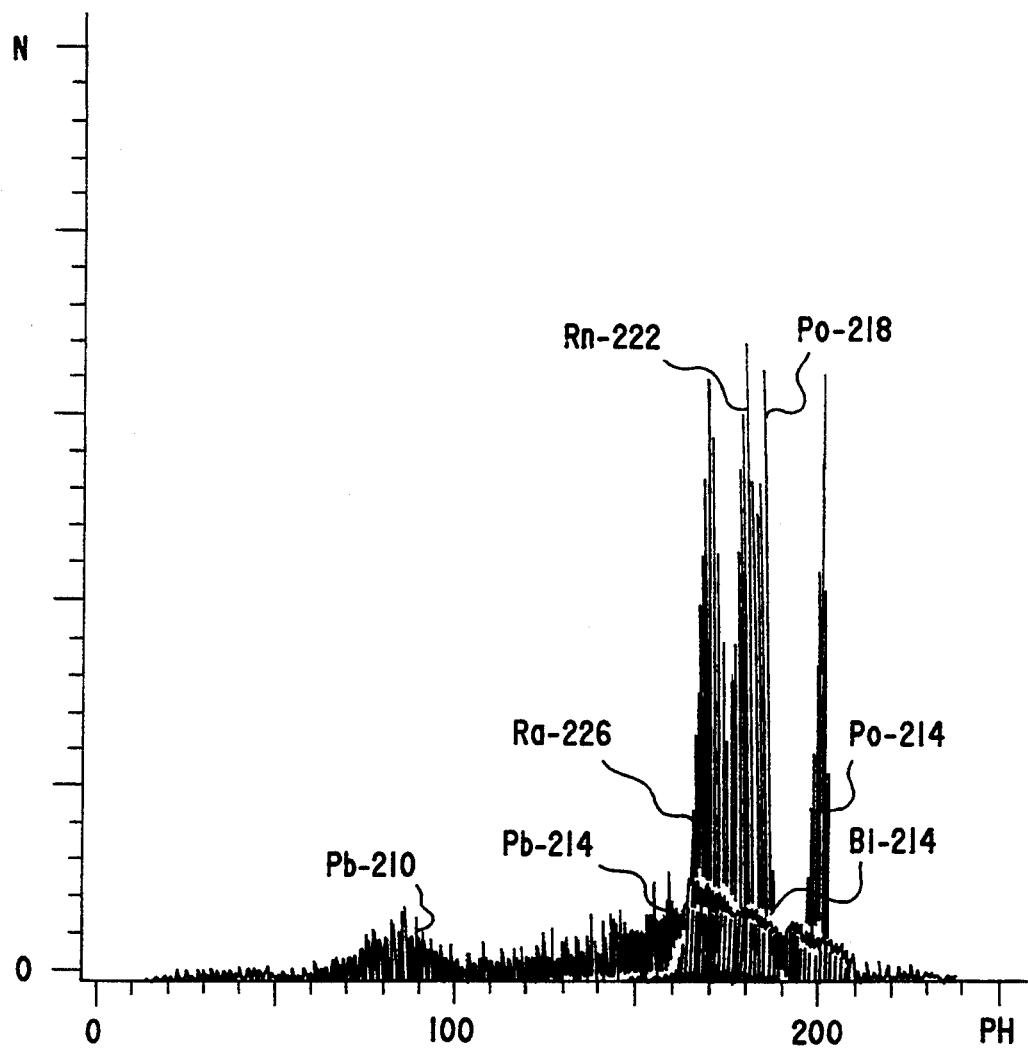
FIG. 2 shows an alpha and a beta spectrum of radium-226 measured by a known liquid scintillation counter.

FIG. 2 shows alpha and beta spectra of radium-226 measured by the 1220 Quantulus TM liquid scintillation detector manufactured by Wallac Oy. In the figure, the PH (pulse height) i.e. the amplitude of the light detector pulse measured in different channels is presented on the horizontal axis and the number of pulses per channel marked by N is presented on the vertical axis.

At the bottom of FIG. 2 there is a horizontal zone due to beta particles wherefrom alpha particles are distinguished as sharp peaks. From the beta particle zone lead-210 can be clearly distinguished, but separation of lead-214 and bismuth-214 from each other is very difficult. Instead, the peaks of the alpha particles of radium-226, radon-222, polonium-218 and polonium 214 are clearly distinguished. However, the separation of alpha and beta particles shown in FIG. 2 can be only obtained in the way presented in the figure if the pulse shape analyzer is optimally preset.

Figure 3:
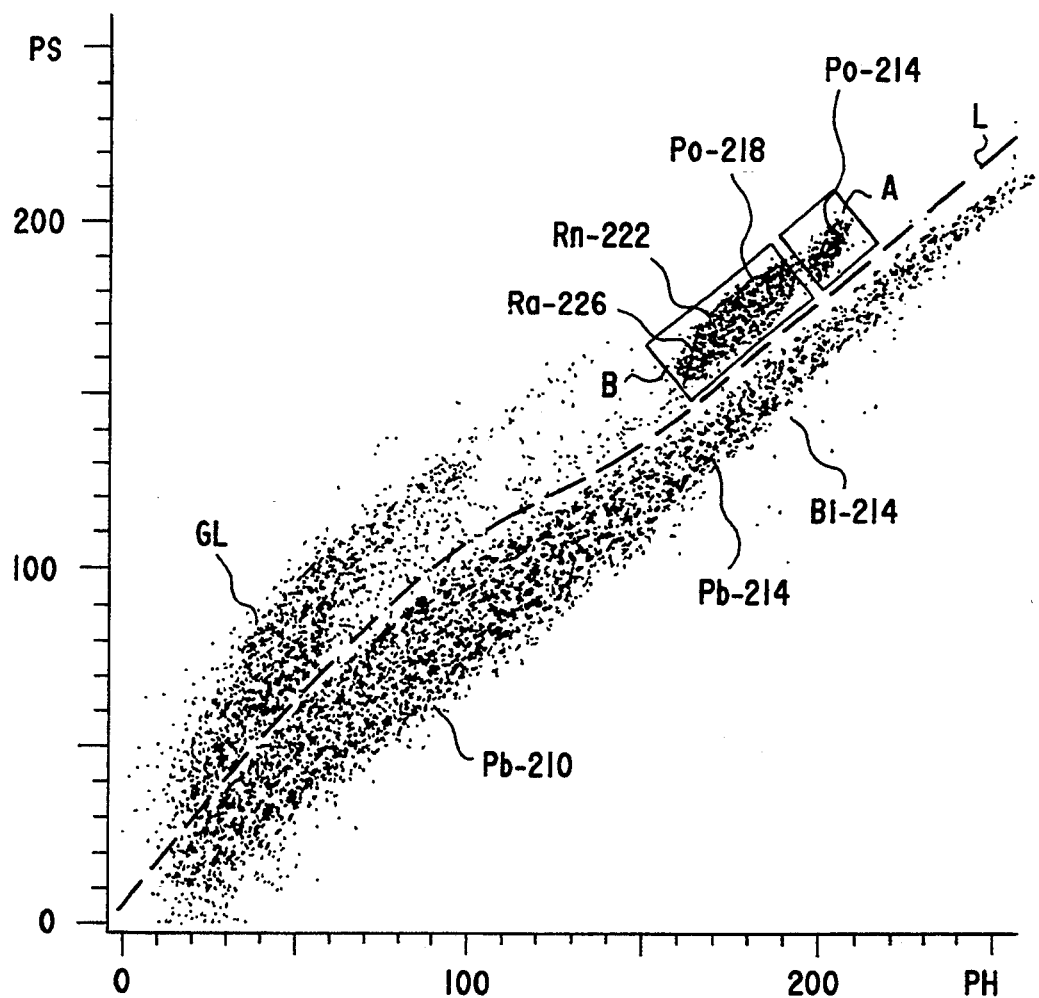
FIG. 3 shows an alpha and a beta spectrum of radium-226 measured by a liquid scintillation counter according to the invention.

FIG. 3 shows the alpha and beta spectra of radium-226 measured by a liquid scintillation counter according to the invention and presented in a different kind of co-ordinate system. The horizontal axis is the pulse height PH, i.e., the signal amplitude of the light detector. The vertical axis is the pulse shape PS, i.e., the signal amplitude of the light detector as a function of time.

It can be seen from the measuring result that on the lower part of the figure there is a nearly uniform band-like formation, which is a beta band due to the detection of scintillation phenomena of beta particles like lead-210, lead-214 and bismuth-214. The dark, oval areas above it are caused by alpha particles. The larger one of them is due to alpha particles of radium-226, radon-222 and polonium-218. The smaller one is due to polonium-214. At the left edge of the figure there can also be seen an area marked G1 which is additional and which is caused by the luminescence of the glass measuring vial or discharges of static electricity.

Therefore, by means of the measuring method according to the invention alpha, beta particles, X-ray, Compton electrons and interfering radiation such as static electricity and chemical luminescence can be separated from each other without any preset settings. By means of known technique the exact separation is difficult, at least without exhaustive setting measurements.

However, the information presented in FIG. 3 can be further illustrated in many different ways. One way is to divide the figure into two parts by a line L. If the two zones divided by the line L are output in a normal way, the spectra of the kind of FIG. 2 are obtained. Since it has been possible to place the line L in an optimal way on the basis of information seen in FIG. 3, these spectra would give a better result than the result of FIG. 2 which is measured by the known technique. As a matter of fact, the result of FIG. 2 has been obtained by doing a number of setting measurements prior to the actual measurement and using a linear division in which case a straight line is used instead of line L.

FIG. 3 can be windowed using whatever curves by giving the co-ordinates of the curve points in the co-ordinate system defined by pulse height PH and pulse shape PS. As an example, windows A and B have been presented which in the exemplary case are rectangular. The information obtainable from them is presented in FIGS. 6 and 7 in a co-ordinate system whose horizontal axis is the pulse height PH and the vertical axis the number of pulses N per channel.

From the measuring result of FIG. 3 the frequency of occurrence N of the detected pulses is readily obtained through investigation of the darkness of the areas generated in the recording of the scintillation phenomena. Darker areas mean a higher number of pulses and correspond to the peaks of the alpha and beta particles in FIGS. 2, 6 and 7.

A second way to illustrate the measuring result of FIG. 3 is to use different colors in outputting the figure to represent the number of pulses belonging to the same point. In this case color expresses the number of pulses at each point of the figure. From a black and white figure it can merely be concluded on basis of darkness whether in some point there are more pulses than in some other point. In this way, from the information of the figure, a third dimension expressing the number of pulses is obtained in addition to pulse height and pulse shape.

Figure 6:
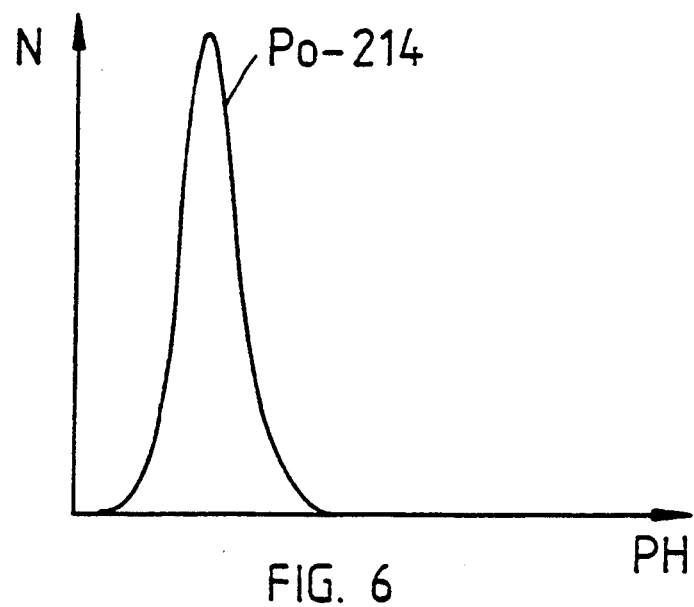
FIG. 6 shows a partial Area A of FIG. 3 in a second co-ordinate system.
Figure 7:
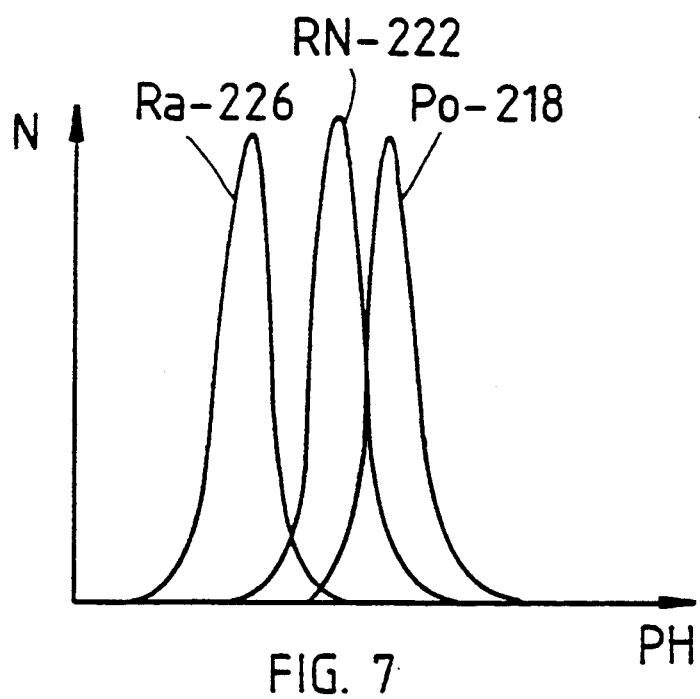
FIG. 7 shows a partial area B of FIG. 3 in a second co-ordinate system.
Figure 8:
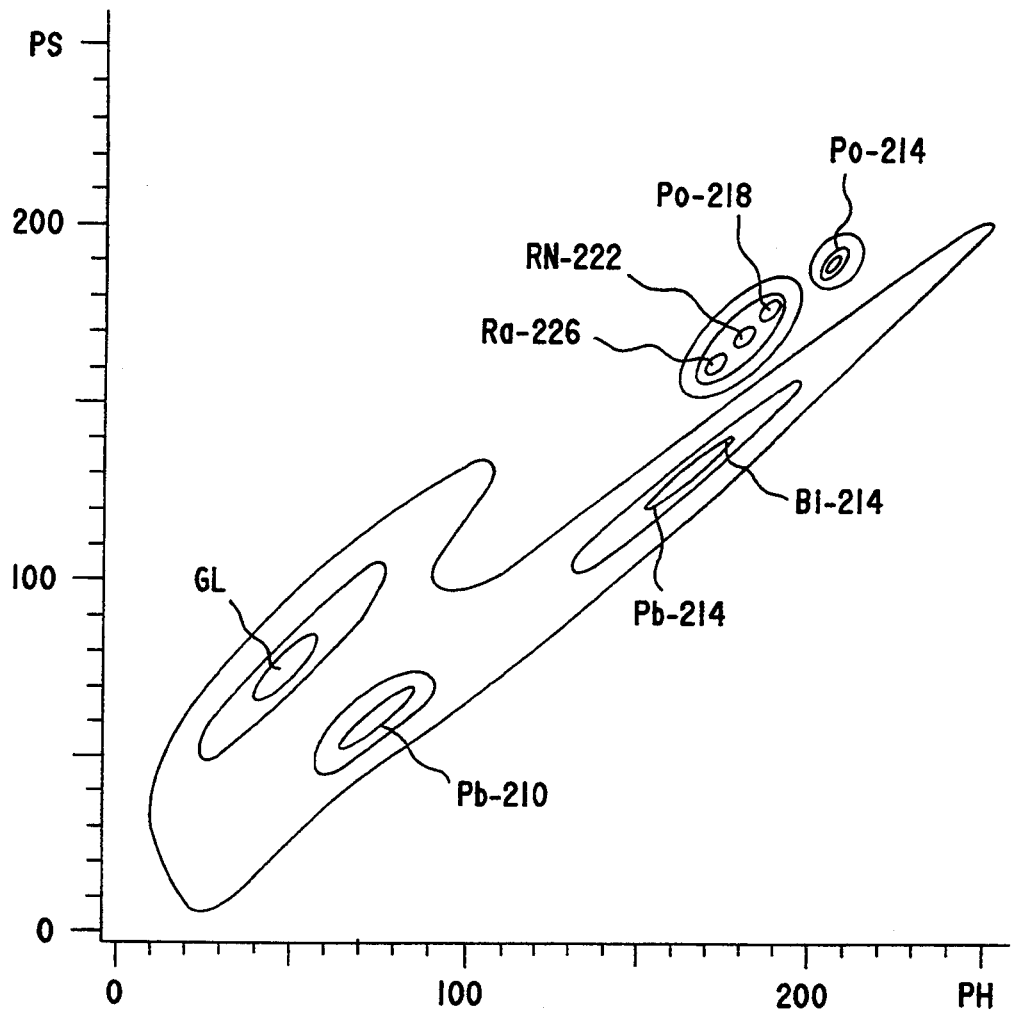
FIG. 8 corresponds to FIG. 3 and shows a second means for output.

A third possibility is to make a three dimensional output where the third axis is the number of pulses of the point. This situation is illustrated in FIG. 8 which has contour lines drawn in a two-dimensional co-ordinate system. By means of the contour lines the same peaks of the alpha particles can be readily read as seen in FIGS. 2, 6 and 7.

Figure 4:
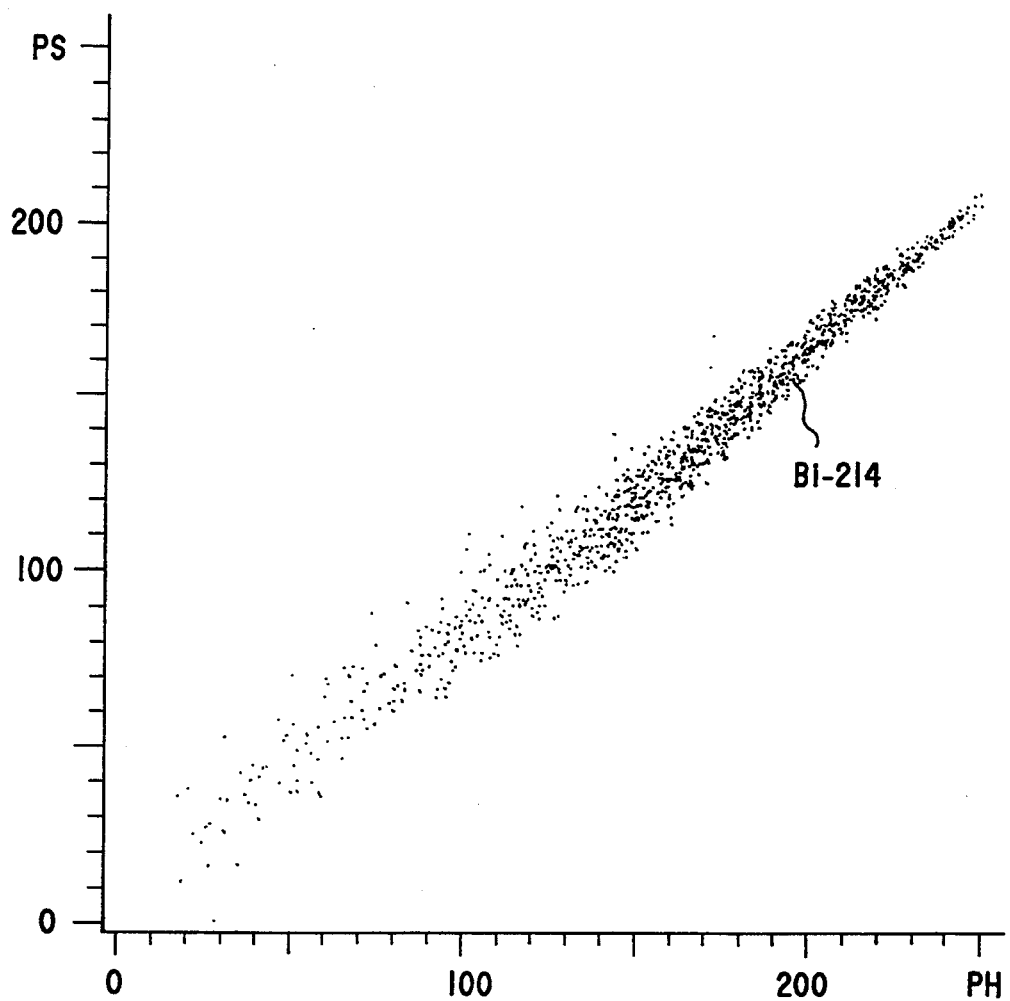
FIG. 4 shows a beta spectrum of Bi-214 of the Ra-226 disintegration chain which is selected from FIG. 3 by means of the method according to the invention.

FIG. 4 shows the beta spectrum of bismuth-214 of the radium-226 disintegration chain which is obtained from the measuring result of FIG. 3 by accepting only these beta disintegrations from those of other beta daughters which have a time difference less than 1 ms to a polonium-214 alpha disintegration.

Figure 5:
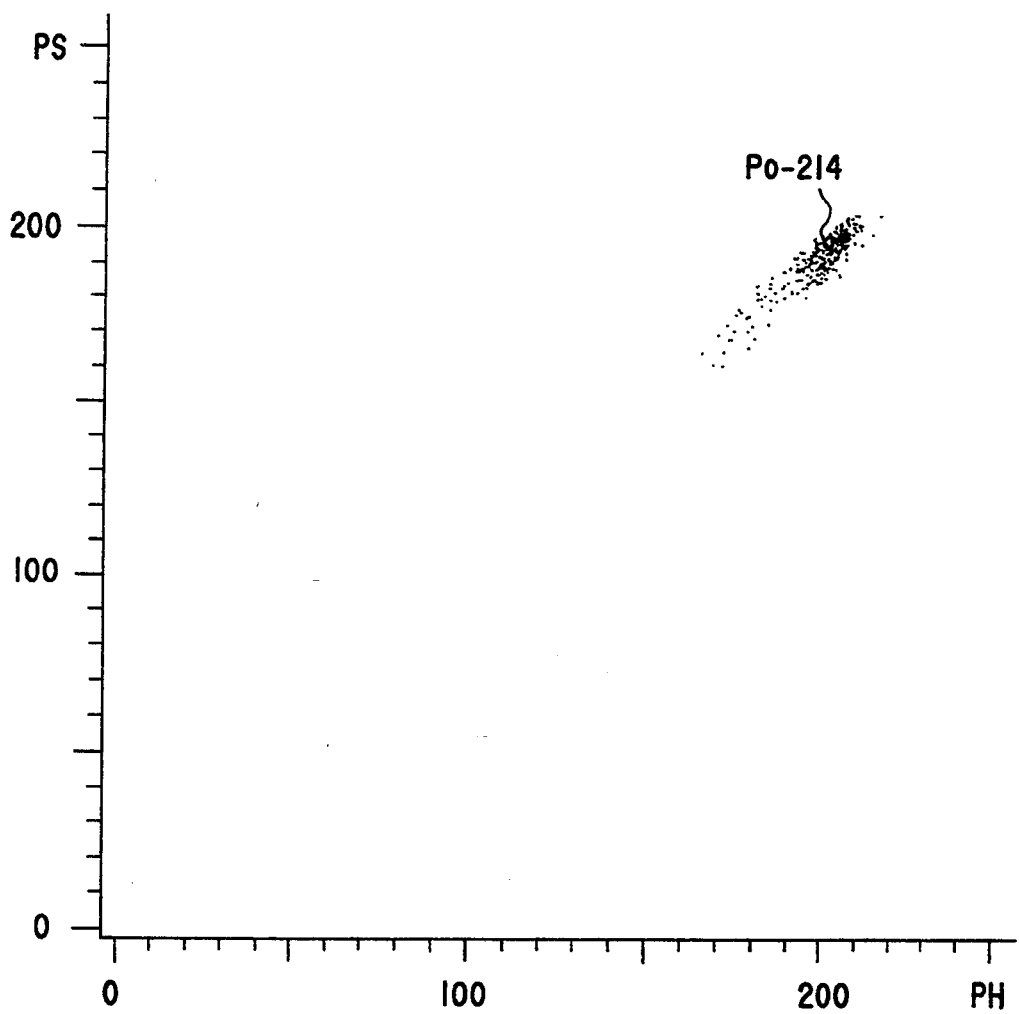
FIG. 5 shows an alpha spectrum of Po-214 of the Ra-226 disintegration chain, which is selected from FIG. 3 by means of the method according to the invention.

FIG. 5 shows a polonium-214 alpha spectrum of radium-226 disintegration chain separated from the measuring result of FIG. 3 which is selected from other alpha daughters by accepting only those alpha disintegrations that have a time difference less than 1 ms to any preceding beta disintegration. The half life of polonium-214 is 164 $\mu$s.

From the measuring result the spectrum of cosmic radiation can also be analyzed from which the state of the sample can be deduced as a function of time. In this case, the damping due to the sample is continuously monitored. Reason for the changes in the sample can be e.g. that it segregates into different phases. An essentially simpler measuring device can thus be obtained since no expensive external standards are required. During measuring all pulses are accepted. Separation is done afterwards in the analysis.

Figure 9:
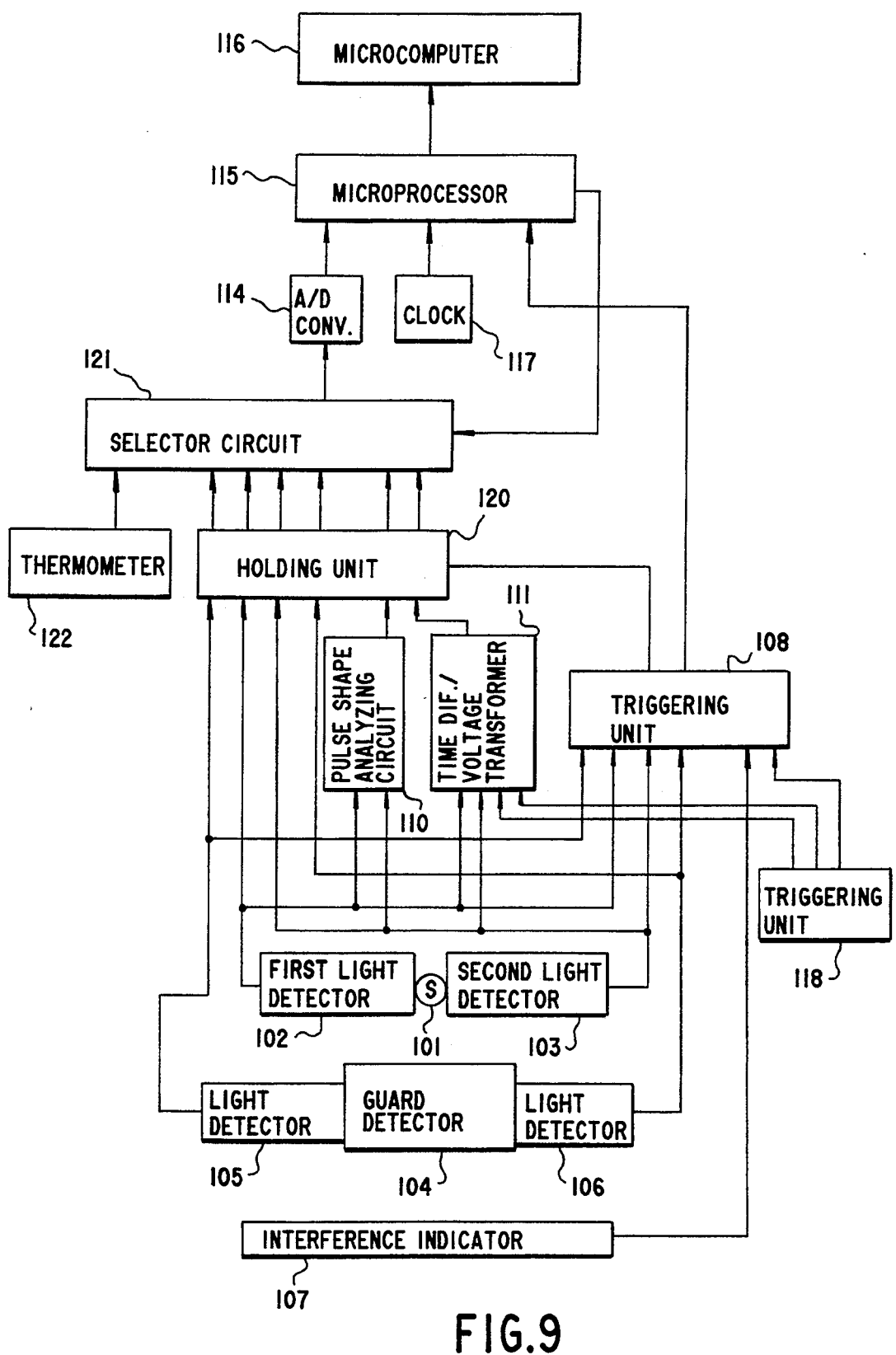
FIG. 9 corresponds to FIG. 1 and shows a second embodiment of the measuring system.

FIG. 9 shows a second embodiment of the measuring system according to the invention. Scintillations coming from the sample 101 kept in a light-tight measuring chamber are detected by means of the first light detector 102 and the second light detector 103. Outside the measuring chamber there is a separate guard detector 104 and the scintillations coming therefrom are detected by means of the light detectors 105 and 106.

The signals from the light detectors 102, 103, 105 and 106 are led to the holding unit 120 and to the triggering unit 108. The signal of the first light detector 102 ad that of the second light detector 103 are additionally connected to the pulse shape analyzing circuit 110. The microprocessor 115 selects by means of the selector circuit 121 the signal to be carried to the A/D converter 114. The signals that can be selected are the temperature given by the thermometer 122, pulse heights given by the light detectors 102, 103, 105 and 106, the pulse shape given by the pulse shape analyzing circuit 110 and the entry time difference of the pulses given by the time difference/voltage transformer 111. The signals provided by the thermometer 122 are obtained during measurement of the sample so that correction coefficients can be calculated during measuring.

The pulse shape analyzer 110 integrates the pulses of the light detectors 102 and 103 using one or more fixed time intervals. The time interval starts at the beginning of the pulses of the light detectors 102 and 103 after the initial time delay, which is changeable. Alternatively, the pulse shape analyzer samples several times using different time intervals.

The timing pulse from the triggering unit 108 informs the microprocessor 115 of the occurrence of the phenomenon. The above mentioned timing pulse can be produced by the first light detector 102 or the second light detector 103 or the light detector 105 or 106 of the guard detector 104.

The timing pulse also stores the states of the above mentioned signals and that of the electromagnetic interference indicator 107 for the microprocessor 115. Furthermore, the pulses of the light detectors 102 and 103 control the operation of the pulse interval clock 117.

The analog-to-digital converter 114, the clock 117 and the triggering unit 108 are connected to the microprocessor 115, which records desired information about the occurrence and sends it further to the microcomputer 116. The microcomputer 116 stores the occurrences in a mass memory unit during measuring.

For calibrating the device, the microprocessor 115 can initiate the triggering of the pulse by means of a calibrating trigger unit 118. The zeros of the light detectors 102, 103, 105 and 106 as well as the unites 110 and 111 can thereby be measured. The calibrating trigger unit 118 can supply the time difference/voltage transformer 111 with two pulses which have a known time difference and by which the sensitivity of the time difference/voltage transformer 111 can be measured.

FIG. 10 shows two different pulse shape curves, which represent the amplitude of $\alpha$-pulse and $\beta$-pulse as a function of time.

FIG. 11 shows schematically the operation of the pulse shape analyzer. The pulse shapes of FIG. 10 can be registered so that the pulse shape analyzer integrates the pulses of the light detectors in this embodiment using several fixed time intervals $t_m$. The first time interval starts at the beginning of the light detector pulse after an initial time delay $t_0$. Then, the initial time delay is changed so that the next time interval $t_m$ starts right after the previous one.

FIG. 12 shows schematically operation of the pulse shape analyzer according to another embodiment. In this example, the pulse shapes of FIG. 10 can be registered so that the pulse shape analyzer integrates the light detector pulses using several different time intervals $t_1$, $t_2$ and $t_3$. Each time interval starts at the same time i.e. at the beginning of the light detector pulse after the initial time delay $t_0$.

FIG. 13 shows operation of the pulse shape analyzer, wherein the pulse shape analyzer integrates the light detector pulse without initial time delay using such a long time interval $t_5$ that the whole pulse is integrated. Thus one can measure the overall height of the pulse i.e. its amplitude.

It is obvious to the specialist in the field that different embodiments of the invention can vary within the limits of claims presented hereinafter.

We claim:

1. Method for use in liquid scintillation counting for detecting, recording and analyzing scintillation phenomena due to ionizing radiation comprising the steps of:
   (a) placing a sample in a measuring chamber;
   (b) detecting and measuring the sample by means of at least two light detectors;
   (c) recording the measurement of the sample;
   (d) reconstructing at least a 2-D representation of the measurement subsequent to recordation of the measurement;
   (e) analyzing the representation of the measurement from the reconstruction of the measurement; and,
   (f) recording information resulting from said analyzing of the measurement.

2. The method according to claim 1, further including:
   (a) recording and measuring signal amplitudes output by said at least two light detectors, said signal amplitudes being representative of said sample; and
   (b) calculating a sum spectrum from pulse heights of said signal amplitudes.

3. A method according to claim 2 further including recording a pulse height signal by measuring an integral of a sum current of said signal amplitudes.

4. A method according to claim 2, further including:
   (a) recording at least two parameters during measurement of said sample; and
   (b) selecting said at least two parameters from a group of parameters including
      (i) signal amplitudes from said at least two light detectors;
      (ii) time of detection of the sample by said at least two light detectors;
      (iii) inactivity of a guard detector;
      (iv) lack of presence of pulse signals from said at least two light detectors; and,
      (v) operational state of an electromagnetic interference indicator.

5. The method according to claim 4, further including recording at least four of said parameters.

6. A method according to claim 2, further including recording a pulse shape signal for separating $\alpha$-radiation from $\beta$-radiation.

7. The method according to claim 2, further including recording time differences between front edges of pulse signals from said at least two light detectors.

8. Method according to claim 2, further including calculating a ratio of pulse heights of the amplitude signals so as to determine a measurement of background subtraction.

9. Method according to claim 2, wherein color express a number of pulses at each point in the reconstructed representation.

10. Method according to claim 2, further including analyzing said sum spectrum to determine the state of the sample as a function of time.

11. Method according to claim 2, further including identifying mutual time correlating phenomena for determining sources of error.

12. Method according to claim 2, further including identifying mutual time correlating phenomena for detecting discharges of static electricity.

13. Method according to claim 2, further including calculating error simultaneously with a measurement utilizing a zero point of the amplitude signals, and triggering a measurement in the absence of a radiation pulse from said sample.

14. Method according to claim 2, further including obtaining a time difference indicator, said indicator being triggered by two pulses having a known time difference.

15. Method according to claim 2, further including recording temperature during the measurement to compensate for different temperatures; and, calculating correction coefficients from the recorded temperatures.

16. Method according to claim 2, further including recording at least a combined amplitude of the amplitude signals as a function of time.

17. Method according to claim 2, further including measuring at least pulse height, pulse shape, guard detector state; and operational state of an electromagnetic interference indicator.

18. method according to claim 2, further including performing a time series analysis for determining periodically repeating interferences, said interferences including discharges of static electricity and chemiluminescence.

19. Method according to claim 2, further including performing a time series analysis so that at least one of the following is determined:
   (i) a time difference distribution function;
   (ii) a scattering diagram indicating successive time differences as a function of each other; and
   (iii) a time difference autocorrelation function revealing deviation from Poisson distribution.

* * * * *